United States Patent Office 3,409,415
Patented Nov. 5, 1968

3,409,415
METHOD OF EXTRACTING SOLUBLE METAL COMPLEXES USING AMINE SOLVENTS
Fletcher L. Moore, Knoxville, Tenn., assignor to the United States of America as represented by the United States Atomic Energy Commission
No Drawing. Continuation-in-part of application Ser. No. 569,757, Aug. 2, 1966. This application May 31, 1967, Ser. No. 643,315
6 Claims. (Cl. 23—340)

ABSTRACT OF THE DISCLOSURE

A method for removing metal values such as trivalent actinides and lanthanides from an aqueous solution substantially free of sulfate. A water soluble organic carboxylic acid is added to the aqueous solution to complex the metal values. The resulting aqueous phase is then contacted with an organic solution of high molecular weight amine having 10 or more carbon atoms to extract a metal-organic acid-amine complex into the organic phase.

CROSS-REFERENCES

This application is a continuation-in-part of my copending application Ser. No. 569,757, filed Aug. 2, 1966, now abandoned.

BACKGROUND OF THE INVENTION

The invention described herein was made in the course of, or under, a contract with the United States Atomic Energy Commission.

My invention relates to methods of forming a metal value-containing complex in a water-immiscible organic liquid.

Liquid-liquid extraction methods have been available for separating metal values such as trivalent actinide and lanthanide values from aqueous solutions; however most of these methods have some disadvantages, such as a requirement for a high concentration of a salting agent or a requirement that the aqueous solution be acidic, and better methods are desirable.

It is accordingly one object of my invention to provide an improved method of forming a soluble metal complex within a water-immiscible organic liquid.

It is another object of my invention to provide an improved liquid-liquid extraction method for removing metal values from an aqueous solution.

It is another object to provide a method of removing trivalent actinides and lanthanides from an aqueous solution which does not require the presence in the aqueous solution of a high concentration of a salting agent.

It is still another object to provide a method of removing metal values from an alkaline aqueous solution.

Other objects of my invention will be apparent from the following description and the attached claims.

I have discovered that high molecular weight amines are capable of forming an organic-soluble mixture with water-soluble organic acids. I have further discovered that such a mixture forms a strong complex with polyvalent metal ions and that this complex is soluble in water-immiscible organic liquids. Some metals including the trivalent actinides and lanthanides form strong complexes in aqueous solutions with organic ions such as citrate, tartrate, oxalate, and ethylenediaminetetraacetate, and these complexes are inextractable with the more commonly used organic solvents, i.e., the alcohols, ketones, and the organophosphorus compounds. However, high-molecular-weight amines unexpectedly extract polyvalent metals in a strongly complexed state. Many metals, such as the trivalent actinides and lanthanides do not form amine-extractable species in dilute nitric acid in the absence of the organic acids.

In accordance with my invention I have provided a composition comprising a high molecular weight amine and a water-soluble organic acid. I have further provided a method of removing polyvalent metal values from an aqueous solution containing said values and substantially free of sulfate comprising the steps of providing said solution with the anion of a water-soluble organic acid selected from the group consisting of monocarboxylic acids, polycarboxylic acids and aminopolycarboxylic acids, contacting the resulting aqueous solution with a water-immiscible organic solution of a high-molecular weight amine, and separating the resulting metal value-loaded amine solution from said aqueous solution.

The term "high molecular weight amines" refers to amines having 10 or more carbon atoms.

The term "polyvalent metal ions" includes ions of all metals except the alkali metals.

My invention provides a method of dissolving water-soluble organic acids such as the aminopolycarboxylic acids as represented by ethylenediaminetetraacetic acid in a water-immiscible organic solution. This in turn provides a method for solubilizing or complexing metals which are already present in an organic liquid by adding a mixture of an organic acid and an amine to such an organic liquid. My invention also provides a method for removing metal values from an aqueous solution. My extraction method has the advantages that (1) it is operable over a wide pH range, from acidic, through neutral, into highly alkaline; (2) the presence of a high concentration of metal salts in the aqueous phase is not necessary; and (3) it enables amines to extract metal values which are otherwise virtually non-extractable with these compounds.

My invention will be illustrated in detail by a method of extracting metal values from an aqueous solution. In carrying out my extraction method the solution containing the metal values to be removed is provided with a water-soluble organic acid. All metals which are capable of forming a complex with an organic acid can be removed from an aqueous solution by my method. The alkali metals are the only ones which do not form such a complex. The potential application in the extraction of gross fission products and actinide elements from nuclear waste solutions makes it particularly useful in this area. Differences in extraction coefficients for various metal species make it useful in separating elements from each other.

I have discovered that a wide variety of water-soluble organic acids form amine-extractable metal complexes and may be employed. Representatives of the useful acids are the monocarboxylic acids of the fatty acid series such as acetic, propionic, valeric, and caprylic acids; the polycarboxylic acids such as oxalic, glutaric, and sebacic; and the aminopolycarboxylic acids such as ethylenediaminetetraacetic acid (EDTA), N-hydroxyethylethylenediaminetriacetic acid, and diethylenetriaminepentaacetic acid. These complexing agents may be used in the form of the acid or in the form of one of their salts.

In order to achieve maximum removal of metal values from the aqueous phase there must be sufficient organic acid present to form a negatively charged anionic species with the metal values. Aminopolycarboxylic acids form an anionic species with a 1:1 molar ratio of acid to metal. The amount of other acids required for maximum metal removal will depend on the original charge on the metal ion as well as on the final charge, and the molar ratio of acid to metal may exceed 6:1 for metal ions having a high positive charge. It is preferred that at least a slight excess over stoichiometric amounts of acid be used. A great excess may be used but there is no advantage to be gained by greatly exceeding the stoichiometric amount.

The aqueous phase must be substantially free of sulfate. In a sulfate-containing system the sulfate successfully competes with the organic acid in forming a complex, and the sulfate complex formed is extracted instead of the organic acid complex. The extraction coefficients for the sulfate complex are considerably lower than the extraction coefficients for the organic acid complex. For instance only about 40–60 percent of a lanthanide sulfate is extracted compared to over 95 percent for some lanthanide-organic acid species.

The aqueous solution containing the complex of organic acid and polyvalent metal is contacted with a solution of a high molecular weight amine in a substantially water-immiscible organic solvent. Any of the high molecular weight primary, secondary, tertiary, or quaternary amines will work in my method. The amines listed in U.S. Patent No. 2,877,250, issued Mar. 10, 1959, to Keith Brown et al., for "Recovery of Uranium Values," as suitable for extracting uranium values from an aqueous acidic solution are all useful in my process. The quaternary amines are especially useful since they will extract metal values from either an acidic or a basic solution.

Any water-immiscible organic solvent capable of dissolving the amine may be used. Typically useful polar solvents are hexone, diisobutylketone, and diisobutylalcohol, and typically useful nonpolar solvents are xylene, diethylbenze, and toluene.

The concentration of amine in the organic solution is not critical and may suitably range from 0.05 mole per liter to 0.8 mole per liter.

The mechanism of the extraction is of the following type:

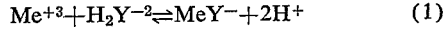

$$Me^{+3} + H_2Y^{-2} \rightleftharpoons MeY^- + 2H^+ \quad (1)$$

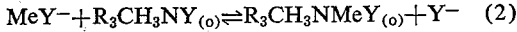

$$MeY^- + R_3CH_3NY_{(o)} \rightleftharpoons R_3CH_3NMeY_{(o)} + Y^- \quad (2)$$

where Me refers to a trivalent lanthanide or actinide ion, $H_2Y^{-2}$ is the anionic species of EDTA, $R_3CH_3NY$ is tricaprylmethylammonium-EDTA and the subscript $o$ refers to the organic phase.

The formation of the aqueous anionic species of the metal ion (Equation 1) is followed by the extraction of this complex (Equation 2). The quaternary ammonium compound and its salt with the metal complex are essentially insoluble in aqueous solutions but highly soluble in most organic solvents.

The metal value-loaded organic solution is then separated from the aqueous solution. If recovery of the metal values is desired they can be removed from the organic phase with aqueous solutions of mineral acids or strong alkalies. The stripping ability of ammonium hydroxide is low and it may therefore be used as a scrubbing agent to effect separation between metal values.

Having thus described my invention the following examples are offered to illustrate it in more detail. Example I is offered to show the removal from an aqueous solution of actinides and lanthanides as represented by americium and europium.

Example I

A 0.01 molar solution of $HNO_3$ containing tracer quantities of $^{241}Am$ and $^{152-4}Eu$ was made 0.2 molar in oxalic acid. This solution was contacted with an equal volume of a 20 percent solution of a tricaprylmethylammonium salt in hexone. Analysis of the resulting two phases showed that over 99.9 percent of the $^{241}Am$ and 99.7 percent of the $^{152-4}Eu$ was extracted into the organic phase.

Example I shows the high extraction power of a quaternary ammonium salt for americium and europium from an aqueous solution containing oxalic acid.

Example II is offered to show the effect of using a primary amine and an aminopolycarboxylic acid.

Example II

A 0.01 molar solution of $HNO_3$ containing tracer quantities of $^{241}Am$ and $^{152-4}Eu$ was made 0.02 molar in ethylenediaminetetraacetic acid and contacted with an equal volume of Primene JM-T (a mixture of primary amines containing 18–22 carbon atoms) in hexone. Analysis of the resulting two phases showed that over 99.9 percent of the $^{241}Am$ and 94.1 percent of the $^{152-4}Eu$ was extracted into the organic phase.

Example III

A series of aqueous solutions made up as in Example I, containing 0.0002 molar disodium ethylenediaminetetraacetate as the water soluble organic species, and having different pH values, were contacted with a 20 percent solution of tricaprylmethylammonium chloride in xylene. The extraction power of the organic phase for $^{241}Am$ and $^{152-4}Eu$ as a function of pH is shown in Table I.

TABLE I

[Aqueous Phase=0.002 molar Disodium EDTA; Organic Phase=20 percent Tricaprylmethylammonium in xylene]

| pH | Tracer $^{241}Am$ | Extracted, percent $^{152-4}Eu$ |
|---|---|---|
| 2.5 | 3.6 | 3.3 |
| 4.4 | 27.0 | 14.8 |
| 9.3 | 99.6 | 95.4 |
| 10.3 | >99.9 | 96.0 |

As can be seen from the data in Table I a quaternary amine extracts metal values over a wide range of pH values, and extracts them especially well at high pH values.

Example IV shows the capability of my method in removing other metals from aqueous solutions.

Example IV

Aqueous solutions 0.002 molar in disodium ethylenediaminetetraacetic acid containing different metal species were contacted with an equal volume of 20 percent of the EDTA salt of tricaprylmethylammonium in xylene. Separations for each metal value were made at pH values of 4.7 and 9.1. The results are given in Table II.

TABLE II

| Metal | Tracer Extracted, percent | |
|---|---|---|
| | pH 4.7 | pH 9.1 |
| $^{137}$Cesium | <1 | <1 |
| $^{85}$Strontium | 27.8 | 9.8 |
| $^{144}$Cerium | 86.9 | 98.0 |
| $^{148}$Promethium | 93.9 | 97.0 |
| $^{153}$Samarium | 94.2 | 97.3 |
| $^{152-4}$Europium | 95.0 | 97.6 |
| $^{91}$Yttrium | 56.6 | 86.7 |
| $^{170}$Thulium | 33.6 | 70.0 |
| $^{241}$Americium | 98.4 | 99.1 |
| $^{244}$Curium | 96.9 | 97.1 |
| $^{252}$Californium | 95.5 | 96.0 |
| $^{59}$Iron | 43.4 | [1] 53.8 |

[1] pH=9.4.

Example V below illustrates methods of removing metal values from the loaded organic phase.

Example V

Organic solution comprising 20 percent of the EDTA salt of tricaprylmethylammonium in xylene containing $^{241}Am$ and $^{152-4}Eu$ were contacted with equal volumes of acidic and alkaline aqueous solutions. The concentrations of metal values in each phase were then measured and the stripping efficiency calculated. The resulting data are given in Table III below.

TABLE III

[Stripping of $^{241}$Am and $^{152-4}$Eu from Quaternary Amine-Xylene Solution]

| Aqueous Phase: | Tracer, Stripped, percent |
|---|---|
| H$_2$O | 5.6 |
| 0.1 M HNO$_3$ | 53.2 |
| 1 M HNO$_3$ | >99.0 |
| 0.1 M NaOH | 1.3 |
| 1 M NaOH | 55.5 |
| 5 M NaOH | 93.0 |
| 9.9 M NaOH | 97.9 |
| 0.1 M NH$_4$OH | 1.3 |
| 1 M NH$_4$OH | 3.1 |
| 6 M NH$_4$OH | 3.2 |
| 12.4 M NH$_4$OH | 1.4 |
| 14.9 M NH$_4$OH | 1.3 |

The foregoing examples are merely intended to illustrate my invention. It is obvious that changes in the mixtures of amine and organic acid and in the organic solvent may be made without departing from my invention.

What I claim is:

1. A method of removing polyvalent metal values from an aqueous solution containing said values and substantially free of sulfate comprising the steps of providing said solution with the anion of a water-soluble aliphatic organic acid selected from the group consisting of monocarboxylic acids, polycarboxylic acids, and aminopolycarboxylic acids, containing the resulting aqueous solution with a water-immiscible organic solution of a high molecular weight amine, and separating the resulting metal value-loaded amine solution from said aqueous solution.

2. The method of claim 1 wherein said metal values are selected from actinide and lanthanide values.

3. The method of claim 1, wherein said organic acid is an aminopolycarboxylic acid.

4. The method of claim 3 wherein said aminopolycarboxylic acid is selected from the group consisting of ethylenediaminetetraacetic acid, N-hydroxyethylethylenediaminetriacetic acid and diethylenetriaminepentaacetic acid.

5. The method of claim 1 wherein said amine is a quaternary amine.

6. The method of claim 1 wherein the pH of the aqueous solution is greater than 7 and said amine is a quaternary amine.

References Cited

UNITED STATES PATENTS

| 3,192,012 | 6/1965 | Rice | 23—23 |
| 3,223,476 | 12/1965 | Hart | 23—340 |

OTHER REFERENCES

Nuclear Science Abstracts, vol 16, 20402; A Calorimetric Study of the Reaction of Rare Earth Ions With EDTA in Aqueous Solution, Mackey, Powell Spedding, Aug. 31, 1962.

A. C. Rice, Chelating Agents in Separation of Rare Earth Compounds by Solvent Extraction with Amines, Bureau of Mines Report of Invest., 6205, pp.1–15, 1963.

BENJAMIN R. PADGETT, *Primary Examiner.*

M. J. McGREAL, *Assistant Examiner.*